(12) United States Patent
Suzuki et al.

(10) Patent No.: US 11,738,496 B2
(45) Date of Patent: Aug. 29, 2023

(54) PREFORM FOR MOLDING DUAL CONTAINER

(71) Applicant: YOSHINO KOGYOSHO CO., LTD., Tokyo (JP)

(72) Inventors: Takanori Suzuki, Tokyo (JP); Koji Watase, Matsudo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 17/952,644

(22) Filed: Sep. 26, 2022

(65) Prior Publication Data

US 2023/0099841 A1 Mar. 30, 2023

(30) Foreign Application Priority Data

Sep. 30, 2021 (JP) .................. 2021-161003

(51) Int. Cl.
  *B29C 49/22* (2006.01)
  *B65D 1/02* (2006.01)
  *B29L 31/00* (2006.01)

(52) U.S. Cl.
  CPC ............ *B29C 49/22* (2013.01); *B65D 1/0215* (2013.01); *B65D 1/0246* (2013.01); *B29K 2995/0041* (2013.01); *B29L 2031/7158* (2013.01)

(58) Field of Classification Search
  CPC ............................ B29C 49/22; B65D 1/0246
  See application file for complete search history.

(56) References Cited

U.S. PATENT DOCUMENTS

2020/0339300 A1  10/2020  Oshino et al.

FOREIGN PATENT DOCUMENTS

CN  2019119476  *  7/2019  ............... B65D 1/02
WO  2019130812 A1  7/2019

OTHER PUBLICATIONS

English machine translation for CN2019119476. (Year: 2019).*

* cited by examiner

*Primary Examiner* — Michael C Miggins
(74) *Attorney, Agent, or Firm* — Oliff PLC

(57) ABSTRACT

A preform for molding a dual container, in which an inner preform is inserted into an outer preform in a state in which a mouth portion of the inner preform is fitted into a mouth portion of an outer preform, the inner preform is formed of a crystalline resin, a crystallized region is provided in at least a portion of the inner preform, the crystallized region having a degree of crystallization greater than that of the other portion, the portion of the inner preform adjacent to the mouth portion from below the mouth portion and located below the outside air introduction hole, a step portion facing upward and a rib extending upward from the step portion are formed on an inner circumferential surface of the inner preform, and at least a part of the rib is adjacent to the crystallized region from above the crystallized region.

4 Claims, 2 Drawing Sheets

PREFORM FOR MOLDING DUAL CONTAINER

CROSS-REFERENCE TO RELATED APPLICATION

Priority is claimed on Japanese Patent Application No. 2021-161003, filed Sep. 30, 2021, the content of which is incorporated herein by reference.

BACKGROUND OF THE INVENTION

Field of the Invention

The present invention relates to a preform for molding a dual container.

Description of Related Art

A preform configured to mold a dual container, the dual container including an inner container deformed to reduce a volume according to reduction in accommodated contents and an outer container in which the inner container is inserted and in which an outside air introduction hole configured to introduce outside air between the inner container and the outer container according to reduction of the contents is provided, includes an inner preform having a cylindrical shape with a bottom and configured to mold the inner container and an outer preform having a cylindrical shape with a bottom and configured to mold the outer container.

As such a preform for molding a dual container, for example, as disclosed in PCT International Publication No. 2019/130812, there is known a configuration. In the configuration, in a state in which a mouth portion of the inner preform is fitted into a mouth portion of the outer preform, the inner preform is inserted into the outer preform, the inner preform is formed of a crystalline resin, and a crystallized region having a degree of crystallization greater than the other portion is provided in at least a portion of the inner preform adjacent to the mouth portion from below the mouth portion and located below the outside air introduction hole.

In the preform, when compressed air is blown into the inner preform and blow molding is performed to form the dual container, a crystallized region is less likely to expand outward in the radial direction. Accordingly, it becomes easier to secure an airway in the upward/downward direction in a portion located below the outside air introduction hole between the inner container and the outer container.

However, in the preform for molding a dual container in the related art, when heating is performed to form the crystallized region in the inner preform, the portion continuous with the crystallized region from above the crystallized region (hereinafter, a connecting portion) may be thermally expended, and the mouth portion of the inner preform may be difficult to be fitted into the mouth portion of the outer preform.

In consideration of the above-mentioned circumstances, the present invention is directed to providing a preform for molding a dual container in which it being difficult for a mouth portion of an inner preform to be fitted into a mouth portion of an outer preform is curbed even when a crystallized region is provided in the inner preform.

SUMMARY OF THE INVENTION

The present invention employs the following means configured to solve the above-mentioned problems. That is, a first aspect of the present invention is a preform for molding a dual container, the dual container including: an inner container deformed to reduce a volume according to reduction of accommodated contents; and an outer container in which the inner container is inserted, the dual container in which an outside air introduction hole configured to introduce outside air between the inner container and the outer container according to reduction of the contents is formed. The preform includes: an inner preform having a cylindrical shape with a bottom and configured to mold the inner container; and an outer preform having a cylindrical shape with a bottom and configured to mold the outer container. In the preform, the inner preform is inserted into the outer preform in a state in which a mouth portion of the inner preform is fitted into a mouth portion of the outer preform, the inner preform is formed of a crystalline resin, a crystallized region is provided in at least a portion of the inner preform, the crystallized region having a degree of crystallization greater than that of the other portion, the portion of the inner preform adjacent to the mouth portion from below the mouth portion and located below the outside air introduction hole, a step portion facing upward and a rib extending upward from the step portion are formed on an inner circumferential surface of the inner preform, and at least a part of the rib is adjacent to the crystallized region from above the crystallized region.

The rib is formed on the inner circumferential surface of the inner preform, and at least a part of the rib is adjacent to the crystallized region from above the crystallized region. Accordingly, even though rigidity of the portion of the inner preform continuous with the crystallized region from above the crystallized region (hereinafter, a connecting portion) is increased and the inner preform is heated when the crystallized region is provided, the connecting portion expanding outward in the radial direction can be suppressed. Accordingly, it is possible to curb it being difficult for the mouth portion of the inner preform to be fitted into the mouth portion of the outer preform.

The rib extends upward from the step portion facing upward. Accordingly, it is possible to easily injection-mold the preform for molding a dual container having the rib.

A second aspect of the present invention is the preform for molding a dual container according to the first aspect. In the preform, the rib is separated downward from an upper end portion of the mouth portion of the inner preform.

The rib is separated downward from the upper end portion of the mouth portion of the inner preform. Accordingly, when the preform for molding a dual container or the dual container is transported into a factory, a jig can be inserted into the upper end portion of the mouth portion, and the jig can be pressed against the inner circumferential surface of the upper end portion of the mouth portion.

A third aspect of the present invention is the preform for molding a dual container according to the first or second aspect. In the preform, a lower end portion of the rib is located on the crystallized region.

The lower end portion of the rib is located on the crystallized region. Accordingly, the rib can reliably increase rigidity of the connecting portion because the rib crosses at least the upper end portion of the crystallized region in the upward/downward direction.

According to the present invention, even when the crystallized region is provided in the inner preform, it is possible to suppress the mouth portion of the inner preform from being hard to be fitted into the mouth portion of the outer preform.

DETAILED DESCRIPTION OF THE INVENTION

Hereinafter, a preform for molding a dual container according to an embodiment will be described with reference to the accompanying drawings.

Figure 1:
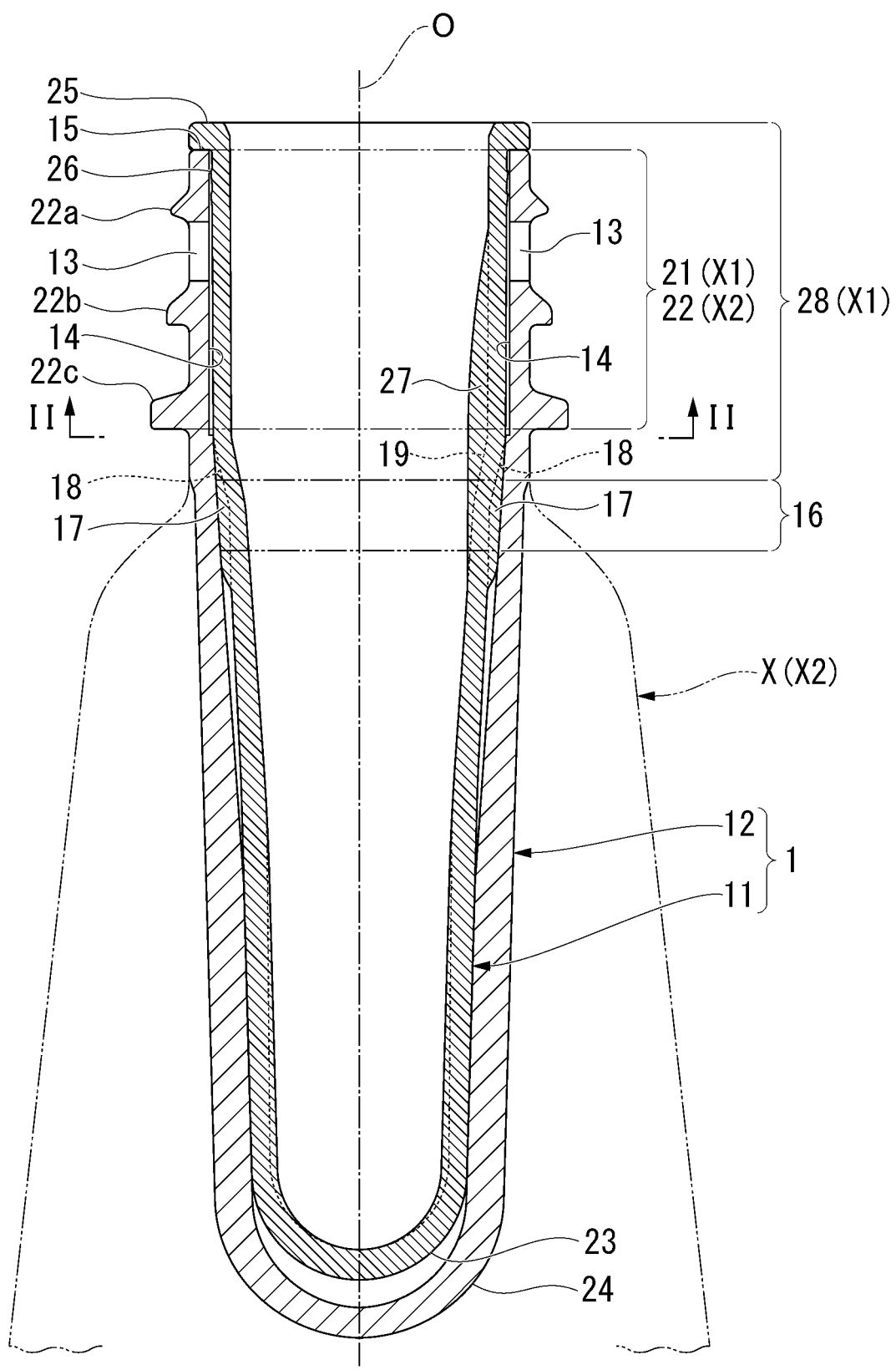
FIG. 1 is a longitudinal cross-sectional view of a preform for molding a dual container shown as an embodiment.
Figure 2:
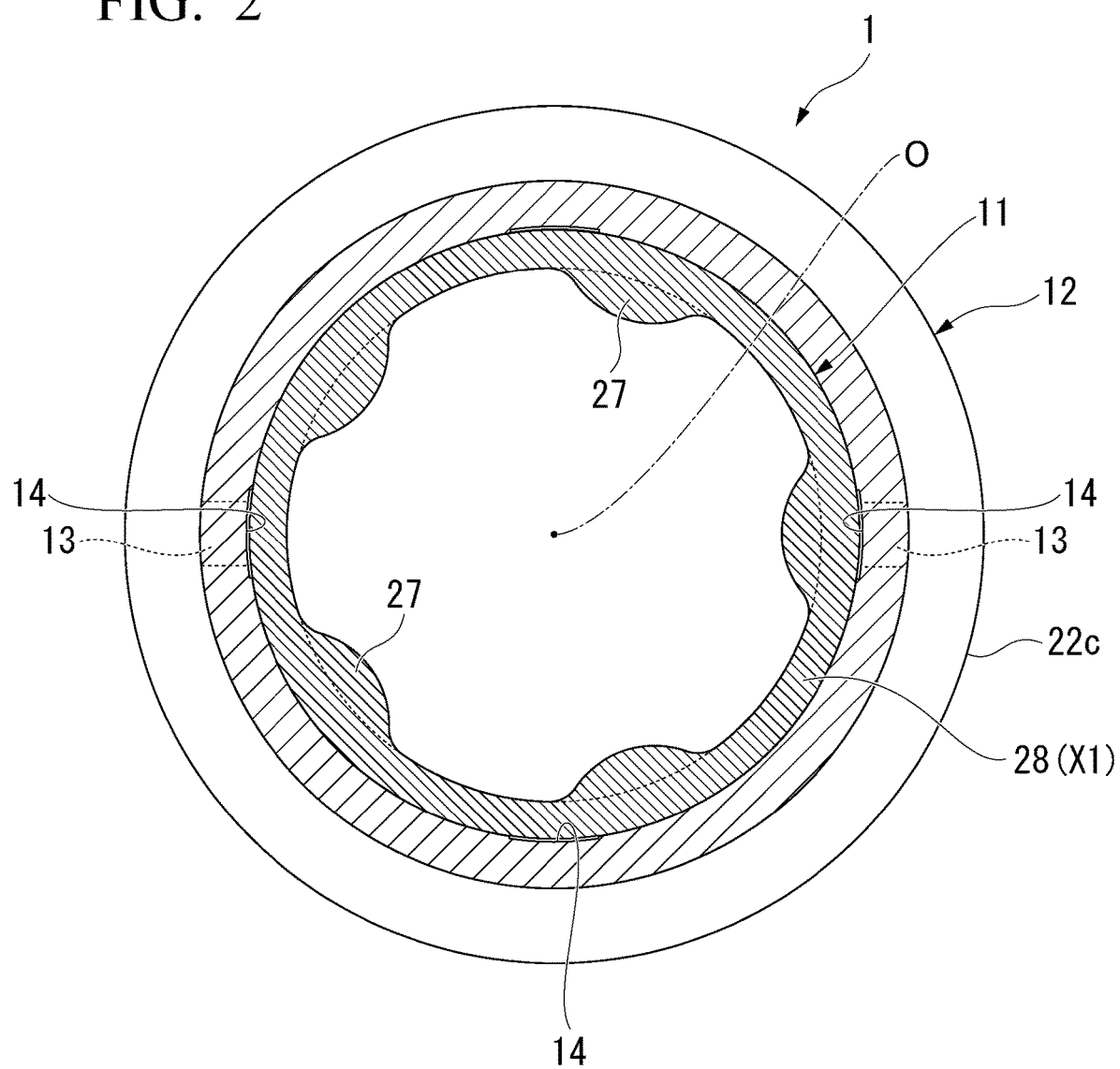
FIG. 2 is a cross-sectional view along line II-II of FIG. 1.

As shown in FIG. 1 and FIG. 2, a preform 1 for molding a dual container is used to mold a dual container X including an inner container X1 deformed to reduce a volume according to reduction of accommodated contents and an outer container X2 in which the inner container X1 is inserted, and an outside air introduction hole 13 configured to introduce outside air between the inner container X1 and the outer container X2 according to reduction of the contents is provided.

The dual container X is formed by blowing compressed air into an inner preform 11 (which will be described below) and blow-molding the preform 1 for molding a dual container. In the dual container X, the inner container X1 is highly flexible, and is separably provided on the inner surface of the outer container X2.

The preform 1 for molding a dual container includes the inner preform 11 having a cylindrical shape with a bottom and configured to mold the inner container X1 and an outer preform 12 having a cylindrical shape with a bottom and configured to mold the outer container X2.

In a state in which a mouth portion (hereinafter, referred to as an inner mouth portion) 21 of the inner preform 11 is fitted into a mouth portion (hereinafter, referred to as an outer mouth portion) 22 of the outer preform 12, a bottom portion (hereinafter, referred to as an inner bottom portion) 23 of the inner preform 11 is inserted into a bottom portion (hereinafter, referred to as an outer bottom portion) 24 of the outer preform 12.

The inner preform 11 and the outer preform 12 are arranged coaxially with a common axis. Hereinafter, the common axis is referred to as a central axis O, a side of the inner mouth portion 21 and a side of the outer mouth portion 22 along the central axis O are referred to as an upper side, and a side of the inner bottom portion 23 and a side of the outer bottom portion 24 along the central axis O are referred to as a lower side. When seen in the upward/downward direction, a direction crossing the central axis O is referred to as a radial direction, and a direction around the central axis O is referred to as a circumferential direction.

Materials of the inner preform 11 and the outer preform 12 are synthetic resin materials, and the materials may be the same material or may be different materials. As an example of the synthetic resin material, for example, polyethylene terephthalate (i.e., PET), polypropylene (i.e., PP), polyethylene (i.e., PE), nylon (i.e., polyamide), ethylene-vinyl alcohol copolymer (i.e., EVOH), and the like, are exemplified. In the example shown, each of the inner preform 11 and the outer preform 12 is formed of PET.

The inner preform 11 is formed of a crystalline resin.

The crystalline resin includes an amorphous portion in which molecular chains are in a disordered state, and a crystalline portion in which molecular chains are regularly arranged. When a content ratio of the crystalline portion is increased, and a degree of crystallization is increased. The degree of crystallization mainly depends on a cooling speed after heating. The degree of crystallization can be measured by, for example, densimetry, an X-ray diffraction method, differential scanning calorimetry, an FT-IR method, a solid state NMR technique, or the like.

A locking protrusion 22a onto which a cap (that is not shown) is undercut-fitted, a sealed protrusion 22b onto which an outer circumferential portion of the cap (that is not shown) is fitted, and a neck ring 22c are formed on an outer circumferential surface of the outer mouth portion 22 in sequence from above toward below. Further, the cap may be threaded on the outer mouth portion 22.

The locking protrusion 22a, the sealed protrusion 22b, and the neck ring 22c protrude outward from the outer mouth portion 22 in the radial direction, and extend continuously throughout the entire length in the circumferential direction. A gap (i.e., a space) between the outer circumferential surface of the sealed protrusion 22b and the inner circumferential surface of the outer circumferential portion of the cap (that is not shown) is air-tightly sealed. An outer diameter of the neck ring 22c is greater than an outer diameter of each of the locking protrusion 22a and the sealed protrusion 22b. The neck ring 22c is located below the outer circumferential portion of the cap (that is not shown).

The outside air introduction hole 13, which was abovementioned, is formed in the outer mouth portion 22. The outside air introduction hole 13 is provided between the locking protrusion 22a and the sealed protrusion 22b.

A longitudinal groove 14 extending downward from an upper end opening edge 15 of the outer preform 12 is formed in an inner circumferential surface of the outer mouth portion 22. The outside air introduction hole 13 is open in the longitudinal groove 14. A lower end portion of the longitudinal groove 14 is located below the neck ring 22c.

The outer mouth portion 22 is a portion of the outer preform 12 including the same position as the lower surface of the neck ring 22c in the upward/downward direction and located thereabove.

The inner mouth portion 21 is a portion of the inner preform 11 fitted into the outer mouth portion 22. That is, the inner mouth portion 21 is a portion of the inner preform 11 including the same position as the lower surface of the neck ring 22c of the outer preform 12 in the upward/downward direction and located thereabove. The outer circumferential surface of the inner mouth portion 21 abuts the inner circumferential surface of the outer mouth portion 22 throughout the entire length in the upward/downward direction. A flange portion 25 extending continuously throughout the entire length in the circumferential direction and abutting the upper end opening edge 15 of the outer preform 12 is provided on the inner mouth portion 21.

Further, the outside air introduction hole 13 may be provided between the lower surface of the flange portion 25 and the upper end opening edge 15 of the outer preform 12.

A projection 26 protruding outward in the radial direction, extending continuously throughout the entire length in the circumferential direction and pressure-welded to the inner circumferential surface of the outer mouth portion 22 is provided on the outer circumferential surface of the inner mouth portion 21. The plurality of projections 26 are provided at intervals in the upward/downward direction. The projection 26 is located above the outside air introduction hole 13 of the outer mouth portion 22. Further, the projection 26 may not be provided.

Here, a crystallized region 16 having a degree of crystallization greater than that of the other portion is provided in at least the portion of the inner preform 11 adjacent to the inner mouth portion 21 from below the inner mouth portion 21 and located below the outside air introduction hole 13.

Transmissivity of light is further lowered in the crystallized region 16 of the inner preform 11 than the other portion. A longitudinal elasticity coefficient is further increased in the crystallized region 16 of the inner preform 11 than the other portion. The crystallized region 16 is a thermally crystallized region in which a degree of crystallization is increased by heating. The crystallized region 16 extends continuously throughout the entire length in the circumferential direction. The crystallized region 16 is separated downward from the inner mouth portion 21.

Further, the crystallized region 16 may be provided in, for example, the inner mouth portion 21 or the like.

A portion of the inner preform 11 including the same position as the upper edge of the crystallized region 16 in the upward/downward direction and located thereabove is a non-extension region 28 that does not extend during blow molding. A size of the crystallized region 16 in the upward/downward direction is greater than an interval in the upward/downward direction between the upper edge of the crystallized region 16 and the lower edge of the inner mouth portion 21, and smaller than the size of the non-extension region 28 in the upward/downward direction. Further, a magnitude correlation of these sizes in the upward/downward direction may be appropriately changed. The crystallized region 16 may be provided in the non-extension region 28. In addition, the region may be provided to cross the non-extension region 28 and the extension region located below the non-extension region 28.

In the example shown, an outer rib 17 protruding outward in the radial direction is provided on the outer circumferential surface of the crystallized region 16. The outer rib 17 secures an air duct in the upward/downward direction between the outer circumferential surface of the inner container X1 and the inner circumferential surface of the outer container X2 in the dual container X. The upper end portion of the outer rib 17 is located above the crystallized region 16, and the lower end portion of the outer rib 17 is located below the crystallized region 16. The outer rib 17 abuts the inner circumferential surface of the outer preform 12. The plurality of outer ribs 17 are provided at intervals in the circumferential direction.

A first step portion 18 facing downward is formed on the outer circumferential surface of the inner preform 11. The outer rib 17 extends downward from the first step portion 18. The first step portion 18 extends upward as it goes outward in the radial direction.

Further, the outer rib 17 may be separated inward from the inner circumferential surface of the outer preform 12 in the radial direction. In addition, the outer rib 17 may be provided on the crystallized region 16 throughout the entire length in the upward/downward direction. In addition, the outer rib 17 may be provided at a position separated from the crystallized region 16 in the upward/downward direction. In addition, the outer rib 17 may be separated inward from the inner circumferential surface of the outer preform 12 in the radial direction, and may abut the inner circumferential surface of the outer container X2 after blow molding.

Then, in the embodiment, a second step portion (i.e., step portion) 19 facing upward and an inner rib (i.e., rib) 27 extending upward from the second step portion 19 are formed on the inner circumferential surface of the inner preform 11. At least a part of the inner rib 27 is adjacent to the crystallized region 16 from above the crystallized region 16.

The inner rib 27 is separated downward from the upper end portion of the inner mouth portion 21. Further, the inner rib 27 may be located on the upper end portion of the inner mouth portion 21.

The upper end portion of the inner rib 27 is located at the same position as the outside air introduction hole 13 in the upward/downward direction. Further, the upper end portion of the inner rib 27 may be located above or below the outside air introduction hole 13.

The lower end portion of the inner rib 27 is located on the crystallized region 16. The inner rib 27 and the second step portion 19 cross the upper end portion of the crystallized region 16 in the upward/downward direction. The lower end portion of the inner rib 27 is provided in the crystallized region 16 throughout the entire length in the upward/downward direction. Further, the inner rib 27 and the second step portion 19 may be separated upward from the crystallized region 16.

A size of the upper end portion of the inner rib 27 in the radial direction is reduced outward (i.e., an upper side) in the upward/downward direction. A size of the lower end portion of the inner rib 27 in the radial direction is also reduced outward (i.e., a lower side) in the upward/downward direction. The lower end portion of the inner rib 27 is continuous with a portion of the inner circumferential surface of the inner preform 11 continuous with the crystallized region 16 from below the crystallized region 16 (i.e., a portion of the inner circumferential surface of the inner preform 11 continuous with the crystallized region 16 from below the crystallized region 16) with no step difference. Further, the lower end portion of the inner rib 27 may be continuous with the inner circumferential surface of the inner preform 11 via a step difference.

A size of the inner rib 27 in the radial direction is maximized in the portion of the inner rib 27 adjacent to the crystallized region 16 from above the crystallized region 16 (i.e., the portion of the inner rib 27 adjacent to the crystallized region 16 from above the crystallized region 16). Further, a size of the inner rib 27 in the radial direction may be the same throughout the entire length in the upward/downward direction, or may differ.

The portion of the inner rib 27 where the size in the radial direction is maximized is separated upward from the crystallized region 16 and located on the lower edge of the inner mouth portion 21. Further, the portion of the inner rib 27 where the size in the radial direction is maximized may be located above the lower edge of the inner mouth portion 21, may be disposed below the lower edge of the inner mouth portion 21, or may be located in the crystallized region 16.

As shown in FIG. 2, the inner rib 27 is formed in a curved surface shape protruding inward in the radial direction when seen in a lateral cross-sectional view perpendicular to the upward/downward direction. When seen in a lateral cross-sectional view, a radius of curvature of the inner rib 27 is greater than a protrusion amount of the inner rib 27 from the inner circumferential surface of the inner preform 11 (i.e., a protrusion amount of the inner rib 27 protruding from the inner circumferential surface of the inner preform 11).

An interval between the inner ribs 27 neighboring in the circumferential direction is greater than the size of the inner rib 27 in the circumferential direction. The plurality of inner ribs 27 are provided at an interval by an odd number in the circumferential direction.

Further, a shape, a disposition place, or the like, of the rib 27 may be appropriately changed.

As described above, according to the preform 1 for molding a dual container of the embodiment, the inner rib 27 is formed on the inner circumferential surface of the inner preform 11, and at least a part of the inner rib 27 is adjacent to the crystallized region 16 from above the crystallized region 16. Accordingly, when rigidity of the portion (hereinafter, a connecting portion) of the inner preform 11 continuous with the crystallized region 16 from above the crystallized region 16 is increased and the crystallized region 16 is provided, even though the inner preform 11 is heated, the connecting portion can be suppressed from expanding outward in the radial direction, and the inner mouth portion 21 can be suppressed from being hard to be fitted into the outer mouth portion 22.

The inner rib 27 extends upward from the second step portion 19 facing upward. Accordingly, the preform 1 for molding a dual container having the inner rib 27 can be easily injection-molded.

The inner rib 27 is separated downward from the upper end portion of the inner mouth portion 21. Accordingly, when the preform 1 for molding a dual container or the dual container X is transported into a factory, a jig can be inserted into the upper end portion of the inner mouth portion 21, and the jig can be pressed against the inner circumferential surface of the upper end portion of the inner mouth portion 21.

The lower end portion of the inner rib 27 is located on the crystallized region 16. Accordingly, the inner rib 27 can reliably increase rigidity of the connecting portion because the inner rib 27 crosses at least the upper end portion of the crystallized region 16 in the upward/downward direction.

Further, the technical scope of the present invention is not limited to the above-mentioned embodiment, and various modifications may be made without departing from the spirit of the present invention.

The outer rib 17 and the first step portion 18 may not be provided on the outer circumferential surface of the inner preform 11. After the inner preform 11 and the outer preform 12 are individually blow-molded and the inner container X1 and the outer container X2 are individually formed, the drum portion of the inner container X1 may be compressed and deformed, and the inner container X1 may be inserted into the outer container X2 while the inner mouth portion 21 is fitted into the outer mouth portion 22 that is not deformed before and after blow molding.

In addition, the components of the embodiment may be appropriately replaced with known components and the embodiment and the variants may be appropriately combined without departing from the spirit of the present invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A preform for molding a dual container,
the dual container including:
an inner container deformed to reduce a volume according to reduction of accommodated contents; and
an outer container in which the inner container is inserted,
the dual container in which an outside air introduction hole configured to introduce outside air between the inner container and the outer container according to reduction of the contents is formed,
the preform comprising:
an inner preform having a cylindrical shape with a bottom and configured to mold the inner container; and
an outer preform having a cylindrical shape with a bottom and configured to mold the outer container,
wherein an outside air introduction holes is formed in a mouth portion of the outer preform,
the inner preform is inserted into the outer preform in a state in which a mouth portion of the inner preform is fitted into the mouth portion of the outer preform,
the inner preform is formed of a crystalline resin,
a crystallized region is provided in at least a first portion of the inner preform, the crystallized region having a degree of crystallization greater than that of a second portion of the inner preform other than the crystallized region, the first portion of the inner preform being adjacent to the mouth portion of the inner preform from below the mouth portion of the inner preform and being located below the outside air introduction hole in the outer preform,
a step portion facing upward and a rib extending upward from the step portion are formed on an inner circumferential surface of the inner preform, and
at least a part of the rib is adjacent to the crystallized region from above the crystallized region.

2. The preform for molding a dual container according to claim 1, wherein
a lower end portion of the rib is located on the crystallized region.

3. The preform for molding a dual container according to claim 1, wherein
the rib is separated downward from an upper end portion of the mouth portion of the inner preform.

4. The preform for molding a dual container according to claim 3, wherein
a lower end portion of the rib is located on the crystallized region.

* * * * *